United States Patent
Pal

(10) Patent No.: US 8,519,578 B2
(45) Date of Patent: Aug. 27, 2013

(54) STARTER GENERATOR STATOR HAVING HOUSING WITH COOLING CHANNEL

(75) Inventor: Debabrata Pal, Hoffman Estates, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 307 days.

(21) Appl. No.: 12/957,596

(22) Filed: Dec. 1, 2010

(65) Prior Publication Data

US 2012/0139370 A1 Jun. 7, 2012

(51) Int. Cl.
*H02K 9/00* (2006.01)
*H02K 9/08* (2006.01)

(52) U.S. Cl.
USPC .............. 310/54; 310/52; 310/57; 310/58

(58) Field of Classification Search
USPC .......... 310/52, 54–58, 61, 63, 112, 184; 165/104.33; 417/365, 410.1
See application file for complete search history.

(56) References Cited

U.S. PATENT DOCUMENTS

| | | | |
|---|---|---|---|
| 2,462,451 A * | 2/1949 | Winther | 310/54 |
| 4,766,557 A | 8/1988 | Twerdochlib | |
| 5,003,207 A | 3/1991 | Krinickas et al. | |
| 6,064,134 A | 5/2000 | El-Antably et al. | |
| 6,097,127 A * | 8/2000 | Rivera | 310/184 |
| 6,268,668 B1 | 7/2001 | Jarczynski et al. | |
| 6,504,274 B2 | 1/2003 | Bunker et al. | |
| 6,596,175 B2 | 7/2003 | Rowe | |
| 6,943,473 B2 * | 9/2005 | Furuse et al. | 310/112 |
| 7,472,547 B2 | 1/2009 | Grosskopf et al. | |
| 7,486,053 B2 | 2/2009 | Qi | |
| 7,663,849 B2 | 2/2010 | Shah et al. | |
| 7,808,215 B2 | 10/2010 | Markunas et al. | |
| 2004/0005228 A1 * | 1/2004 | Agrawal et al. | 417/365 |
| 2008/0223557 A1 * | 9/2008 | Fulton et al. | 165/104.33 |
| 2009/0162222 A1 * | 6/2009 | Iguchi et al. | 417/410.1 |
| 2010/0013329 A1 * | 1/2010 | Heidenreich et al. | 310/54 |
| 2010/0164310 A1 * | 7/2010 | Dames et al. | 310/54 |

FOREIGN PATENT DOCUMENTS

JP 2003088013 A * 3/2003

OTHER PUBLICATIONS

Machine Translation JP2003088013 (2003).*

* cited by examiner

*Primary Examiner* — Tran Nguyen
*Assistant Examiner* — Jose Gonzalez Quinones
(74) *Attorney, Agent, or Firm* — Carlson, Gaskey & Olds, PC

(57) ABSTRACT

A housing for a generator stator has a port through the housing and communicates with a channel extending circumferentially across an inner bore of the housing. The channel extends for a depth along a first distance. An inner bore of the housing is at a radius. A ratio of the depth to the radius is between 0.018 and 0.035. In addition, a generator including the basic cooling structure, and a method of assembling the generator are also disclosed.

17 Claims, 4 Drawing Sheets

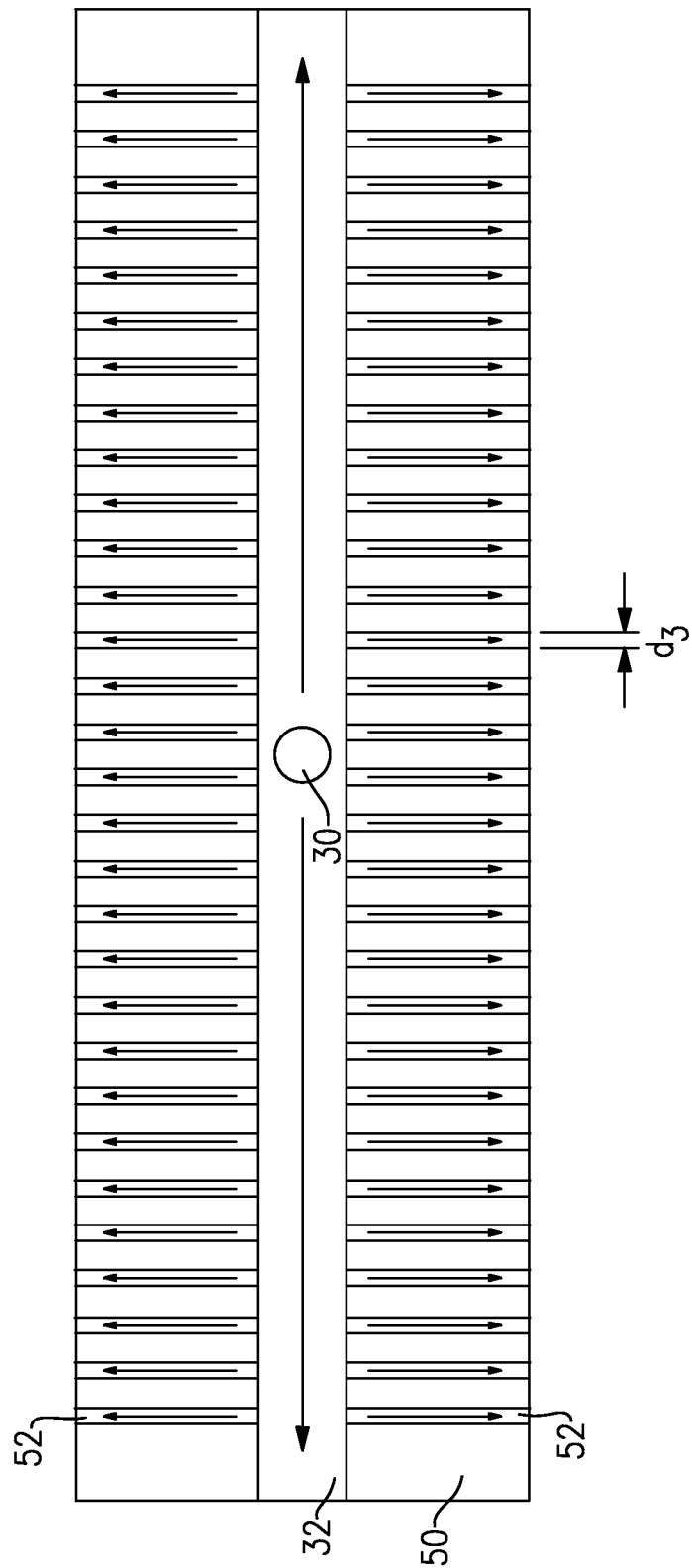

STARTER GENERATOR STATOR HAVING HOUSING WITH COOLING CHANNEL

BACKGROUND

This application relates to a housing structure that provides a cooling oil flow path between a stator housing, and a stator core.

Generators include a rotor which is driven to rotate, and carry magnetic features adjacent to magnetic features in a stator. The relative rotation of the rotor adjacent to the stator generates electrical power. The electrical power is utilized for various purposes.

One typical application for a generator is in an aircraft auxiliary power unit (APU). An APU is provided with a smaller gas turbine engine which is utilized prior to full start-up of the main gas turbine engines on an aircraft. The turbine on the APU is started, and drives a rotor to generate electricity for use by the aircraft prior to the actuation of the main gas turbine engines on the aircraft.

The generator in the APU requires cooling, and in particular cooling between a stator housing and the stator core to cool the stator winding and core. In known APUs, a complex heat exchanger is provided between the housing and the core, and includes a plurality of channels formed in the housing.

The housing is typically formed of a material that has a greater co-efficient of thermal expansion than does the stator core. The APU is subject to extreme temperature changes. As an example, the APU is typically operational on the ground, and can reach high temperatures. The cooling is particularly important at this operational point.

Conversely, when the aircraft is at cruise altitude, the APU is typically not operational. The APU is typically located in an unpressurized tail cone of the aircraft. During the cruise portion of a flight, this tail cone location of the aircraft is typically at extremely low temperatures at this point. The difference in co-efficient of thermal expansion between the housing and the core causes changing sizes of the housing and the core, and at the interface between the two. This results in compressive stress on the stator core caused by the stator housing, resulting in reduced fatigue life of the housing. In addition, for more electric aircraft, it may be required for the APU to start during the cruise portion of a flight. At such condition, the compressive load on the stator core may result in reduced electrical performance of the core. The existing cooling channels raise concerns due to this differing expansion rate.

SUMMARY

A generator stator has a housing. A port extends through the housing and communicates with a channel extending circumferentially across an inner bore of the housing. The channel extends for a depth along a first distance. An inner bore of the housing is at a radius. A ratio of the depth to the radius is between 0.018 and 0.035. In addition, a generator including the basic cooling structure, and a method of assembling the generator are disclosed and claimed.

These and other features of the present invention can be best understood from the following specification and drawings, the following of which is a brief description.

BRIEF DESCRIPTION OF THE DRAWINGS

FIG. 5 is a flow schematic for the alternative embodiment.

DETAILED DESCRIPTION

Figure 1:
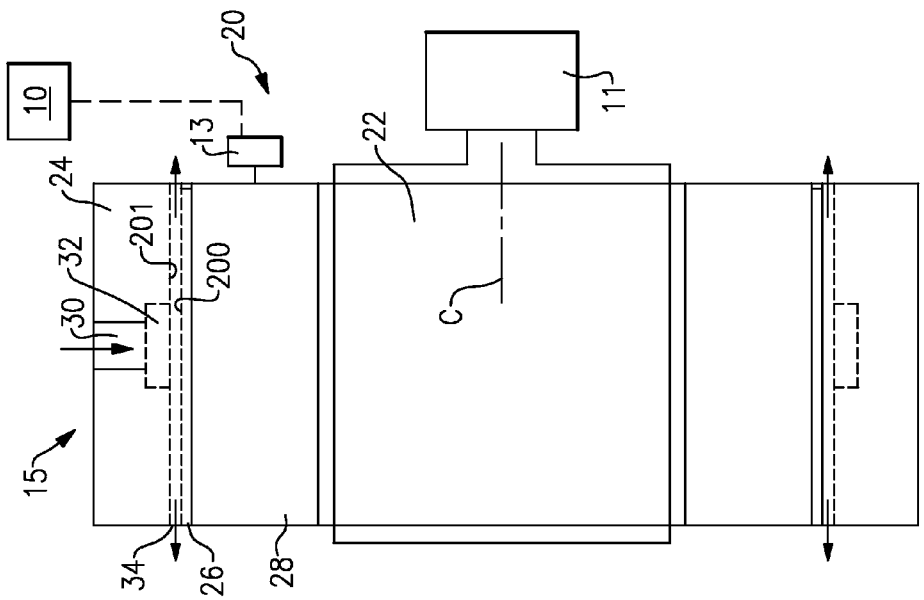
FIG. 1 shows a schematic cross-sectional view through a generator.

FIG. 1 shows a generator 20 incorporated into an APU 15. As known, the APU generates power from a source of rotation, such as a small gas turbine engine 11, which drives a rotor 22. The rotor 22 is provided with coils which are driven to rotate adjacent to stator conductors 27 (see FIG. 2) in a stator core 28. Power flows from the stator core 28 to a user 13 of the power. The "user" 13 is typically various electrical requirements on an aircraft. In addition, user 13 may provide a source of power to start a main gas turbine engine 10.

As shown, the stator core 28 is surrounded by a sleeve 26. The sleeve is typically force-fit or press-fit onto the core 28. The combined core 28 and sleeve 26 is then inserted within a bore in an outer housing 24.

The outer housing 24 is typically formed of a material having a greater co-efficient of thermal expansion than the sleeve 26 or core 28. In one example only, the stator housing 24 may be formed of a magnesium or aluminum material. In such an application, the sleeve 26 may be formed of steel, while the core formed of a magnetic material such as Hiperco50®. Hiperco50® is available from Carpenter Technology Corp. of Wyomissing, Pa. Of course, any number of other materials may be utilized. However, it is generally true that the stator housing will have a much higher co-efficient of thermal expansion than the sleeve 26 and core 28.

Figure 2:
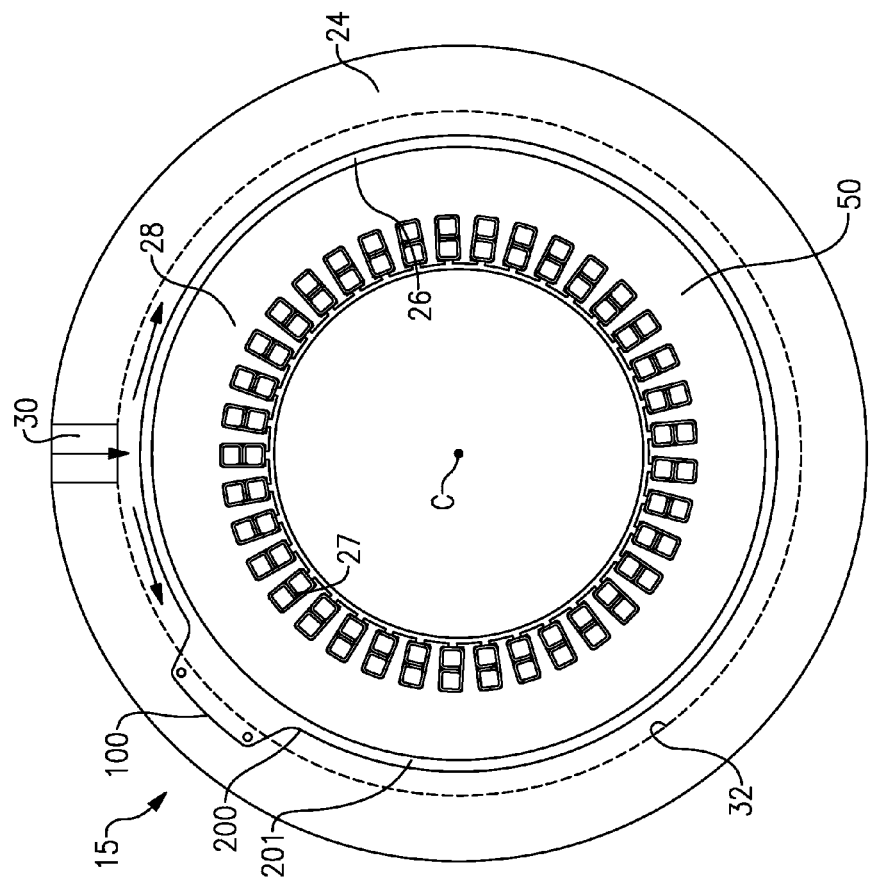
FIG. 2 is a cross-sectional view taken generally 90° from FIG. 1.

In addition, a bracket 100 is formed on sleeve 26, as shown in FIG. 2, some localized connection may connect the sleeve 26 to the housing 24. The connection structure is known.

An oil flow supply port 30 extends through the housing 24, and into a single cooling channel 32. The single cooling channel 32 extends circumferentially about a rotational axis C of the rotor 22.

During operation of the APU 15, there is a gap between the outer periphery 200 of the sleeve 26 and the inner periphery 201 of the housing 24. This gap allows the flow of fluid from the single channel 32 along the entire axial length of the sleeve 26.

As can be appreciated, when the APU 15 is operational, the housing 24 will expand at a greater rate than the sleeve 26, and a gap will exist. On the other hand, when the APU is shut down, and the system is at flight altitude, and extreme low temperature, the housing 24 may contract to a greater extent than the sleeve 26, and may actually contact the sleeve. However, at that point, coolant need not flow.

Figure 3:
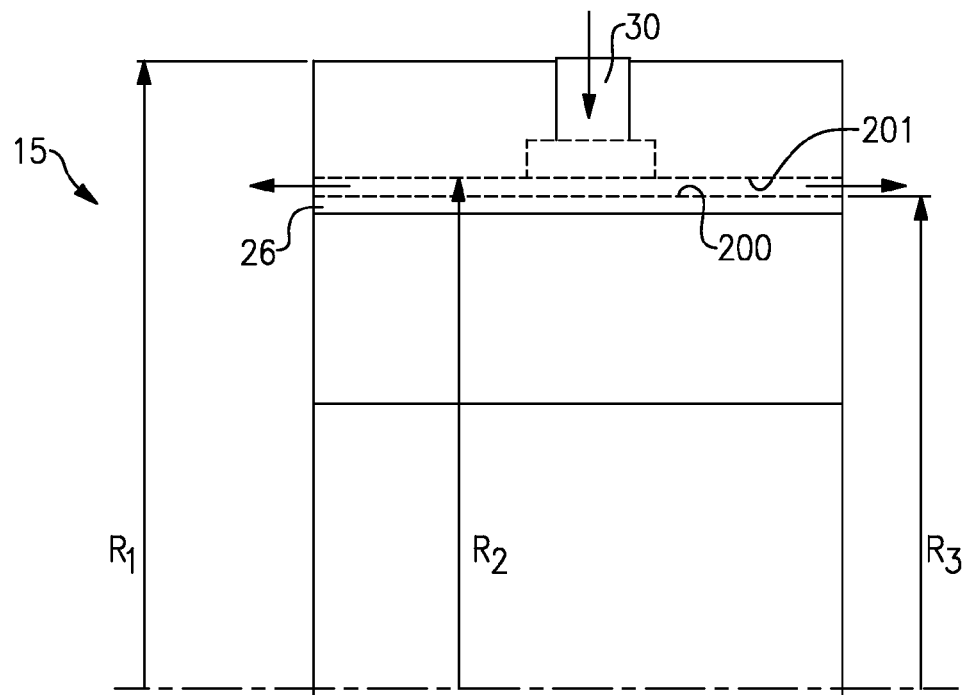
FIG. 3 is a view similar to FIG. 1, but showing dimension.

FIG. 3 shows detail of dimensions in the APU 15. As shown, the housing 24 has an outer radius $R_1$ and an inner radius $R_2$. Inner radius $R_2$ is to the surface 201. The sleeve 26 has an outer radius $R_3$, again to the surface 200. In one embodiment, $R_1$ was 3.165" (8.04 cm) $R_2$ was 2.85" (7.24 cm) and $R_3$ was 2.835" (7.2 cm) A length $L_1$ of the channel 32 is defined, and a length $L_2$ of the overall axial length of the core and sleeve 26 is also defined. In one embodiment, $L_2$ was 3.83" (9.73 cm), and $L_1$ was 1.01" (2.56 cm). In embodiments, a ratio of $L_1$ to $L_2$ is between 0.13 and 0.39. A ratio of $L_1$ to $R_2$ is between 0.175 and 0.52. In embodiments, a ratio of R3 to R2 is between 0.991 and 0.997. As also shown, a depth of the channel 32 is defined as $d_1$. In one embodiment, $d_1$ was 0.065" (0.165 cm). In addition, in this embodiment, the clearance or gap between the surfaces 200 and 201 at operating hot oil temperature of 107 C is $d_2$. In one embodiment, $d_2$ is 0.005" (0.0127 cm). In embodiments, a ratio of $d_1$ to $d_2$ was between 10 and 20.

In further embodiments, a ratio of $d_1$ to $R_2$ is between 0.18 and 0.035.

With this embodiment, if the sleeve 26 is mounted eccentrically within the bore of the housing 24, it can affect the cooling characteristics. It would be desirable that the sleeve is centered without eccentricity. If there is to be eccentricity, the restriction is desirably closer to the port 30, such that there is more unrestricted flow at areas remote from the port 30. However, again, it is desirable that the sleeve be centered.

Figure 4:
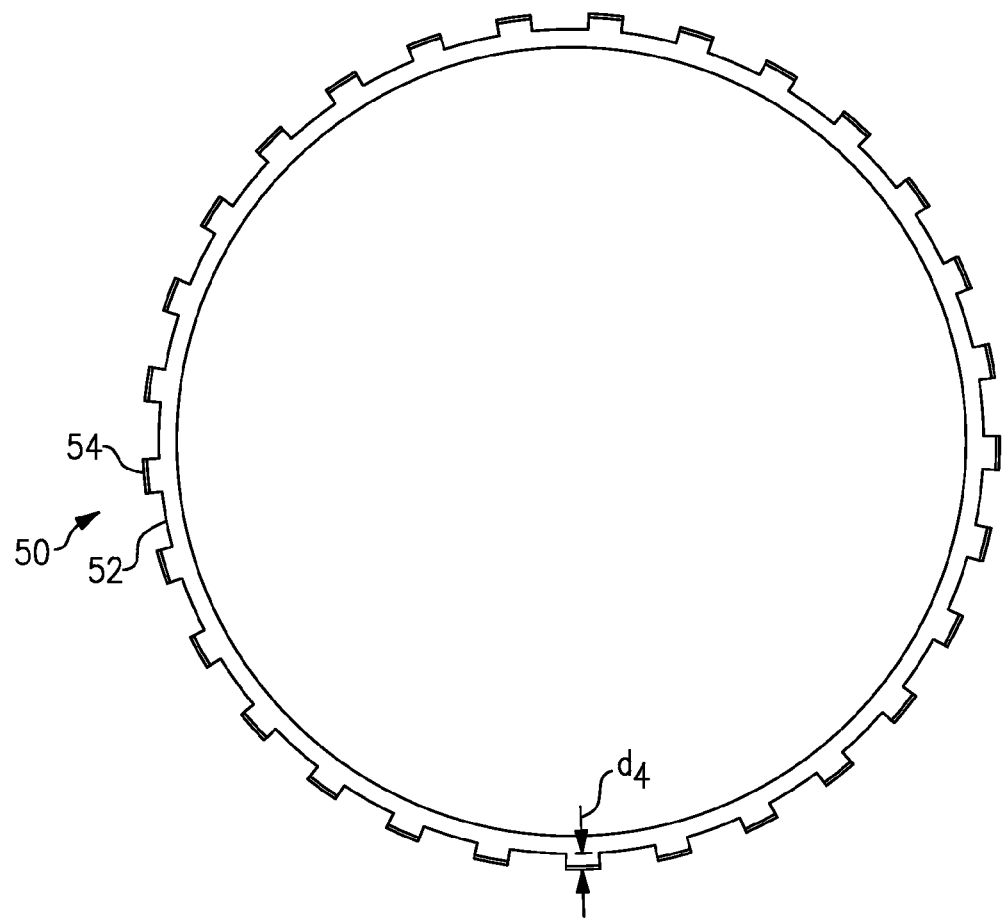
FIG. 4 shows an alternative embodiment.

FIG. 4 shows an embodiment of the sleeve 50 wherein there are additional passages 52 between enlarged portions 54. As shown in FIG. 5, with this alternative embodiment, the coolant can flow into the port 30, into the channel 32, and then to the channels or passages 52 to facilitate the flow across the entire surface area of the sleeve. This embodiment allows uniform flow distribution over the entire back iron area. In addition, during cold operation of the APU, when the sleeve outer diameter may be in close contact with the housing inner diameter, these channels in the sleeve allows for proper oil flow distribution, thus reducing the cold condition pressure drops for flow through the back iron area.

In embodiments, these passages 52 can have a circumferential width of $d_3$ and a depth of $d_4$. In one embodiment, $d_3$ is 0.02" (0.051 cm), and $d_4$ was also 0.02" (0.051 cm). It is desirable that in embodiments, a ratio of $d_3$ to $d_4$ is between 0.4 and 2.

In a method of assembling a generator, the steps include inserting a stator core into a sleeve, and inserting the combined stator core and sleeve into a bore and housing. The housing includes a housing body formed of a material having a relatively high co-efficient of thermal expansion, and the stator core and sleeve formed of a material having a lower co-efficient of thermal expansion. A port communicates with a channel extending circumferentially across an inner bore of the housing, with the inner bore defining a central axis. The channel extends for a radial depth, and the inner bore of the housing is at a radius. A ratio of the depth to the radius is between 0.018 and 0.035. The stator core and sleeve are mounted within the housing so as to maintain a gap between the outer periphery of the sleeve and the inner bore in the housing at ambient temperatures. Further, some mechanical connection, such as bracket 100 may secure the combined stator core and sleeve within the housing.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A housing for a generator stator comprising:
   a housing with a lubricant supply extending through said housing and communicating with a channel extending circumferentially across an inner bore of said housing defining a central axis;
   said channel extending for a radial depth, and said inner bore of said housing being at a radius, a ratio of said depth to said radius being between 0.018 and 0.035;
   said channel extends for a first axial length, and said housing extends for a second axial length, a ratio of said first axial length to said second axial length is between 0.13 and 0.39; and
   a ratio of said first axial length to said radius is between 0.175 and 0.52.

2. The housing as set forth in claim 1, wherein said housing is formed of one of an aluminum or magnesium material.

3. A generator comprising:
   a stator core surrounded by a stator sleeve, and a stator housing surrounding said stator sleeve, said stator housing having an inner bore, and said stator sleeve having an outer diameter, there being a gap between said inner bore and said outer diameter at ambient temperature, with said gap being defined between said stator housing inner bore and said stator sleeve outer diameter across an axial length of said stator sleeve by having a nominal outer diameter of said stator sleeve being, less than a nominal inner diameter of said inner bore;
   the housing formed of a material having a relatively high co-efficient of thermal expansion, the stator core and sleeve formed of materials having a relatively low co-efficient of thermal expansion;
   a port extending through said housing, said port communicating with a channel extending circumferentially across an inner bore of said housing; and
   said channel extending for a radial depth, and said inner bore of said housing being at a radius, a ratio of said depth to said radius being between 0.018 and 0.035.

4. The generator as set forth in claim 3, wherein said channel extends for a first axial length, and said housing extends for a second axial length, a ratio of said first axial length to said second axial length is between 0.13 and 0.39.

5. The generator as set forth in claim 4, wherein a ratio of said first axial length to said radius is between 0.175 and 0.52.

6. The generator as set forth in claim 3, wherein said housing is formed of one of an aluminum or magnesium material.

7. The generator as set forth in claim 6, wherein the sleeve is formed of a steel.

8. The generator as set forth in claim 7, wherein the stator core is formed of a magnetic material.

9. The generator as set forth in claim 8, wherein the magnetic material is Hiperco50®.

10. The generator as set forth in claim 3, wherein a ratio of a radius to an outer surface of said sleeve to the radius of said inner bore of said housing is 0.991 to 0.997.

11. The generator as set forth in claim 10, wherein a ratio of said depth of said channel compared to a radial clearance between an outer periphery of said sleeve and said inner bore is 10 to 20.

12. The generator as set forth in claim 3, wherein said stator sleeve outer diameter is defined by circumferentially spaced enlarged portions, and there being intermediate axial passages circumferentially spaced between said enlarged portions to facilitate the flow of coolant.

13. The generator as set forth in claim 12, wherein said passages on the outer periphery of the stator sleeve extend for a depth and a circumferential width, and a ratio of said circumferential width of said passages in said stator sleeve to the depth of said passages in said stator sleeve is between 0.4 and 2.0.

14. A method of assembling a generator comprising the steps of:
   (a) inserting a stator core and sleeve into an inner bore in a housing, the stator core and sleeve having a relatively low co-efficient of thermal expansion, the housing including a housing body formed of a material having a relatively high co-efficient of thermal expansion, and said port communicating with a channel extending circumferentially across said inner bore of said housing, with the inner bore defining a central axis;
   (b) said channel extending for a radial depth, and said inner bore of said housing being at a radius, a ratio of said depth to said radius being between 0.018 and 0.035, and said channel extending for a first axial length, and said housing extends for a second axial length, and a ratio of said first axial length to said second axial length being between 0.13 and 0.39 and a ratio said first axial length to said radius being between 0.175 and 0.52;

(c) maintaining a gap between the inner bore of the housing and an outer periphery of the sleeve at ambient temperatures, with said gap being defined between said stator housing inner bore and said stator sleeve outer diameter across an axial length of said stator sleeve by having a nominal outer diameter of said stator sleeve being less than a nominal inner diameter of said inner bore; and (d) securing said stator sleeve and core to said housing.

15. The method as set forth in claim 14, wherein a bracket is formed on said stator sleeve, and said bracket is secured to said housing.

16. The method as set forth in claim 14, wherein said housing is formed of one of an aluminum or magnesium material.

17. The method as set forth in claim 14, wherein the sleeve is formed of a steel.

\* \* \* \* \*